Patented Aug. 12, 1941

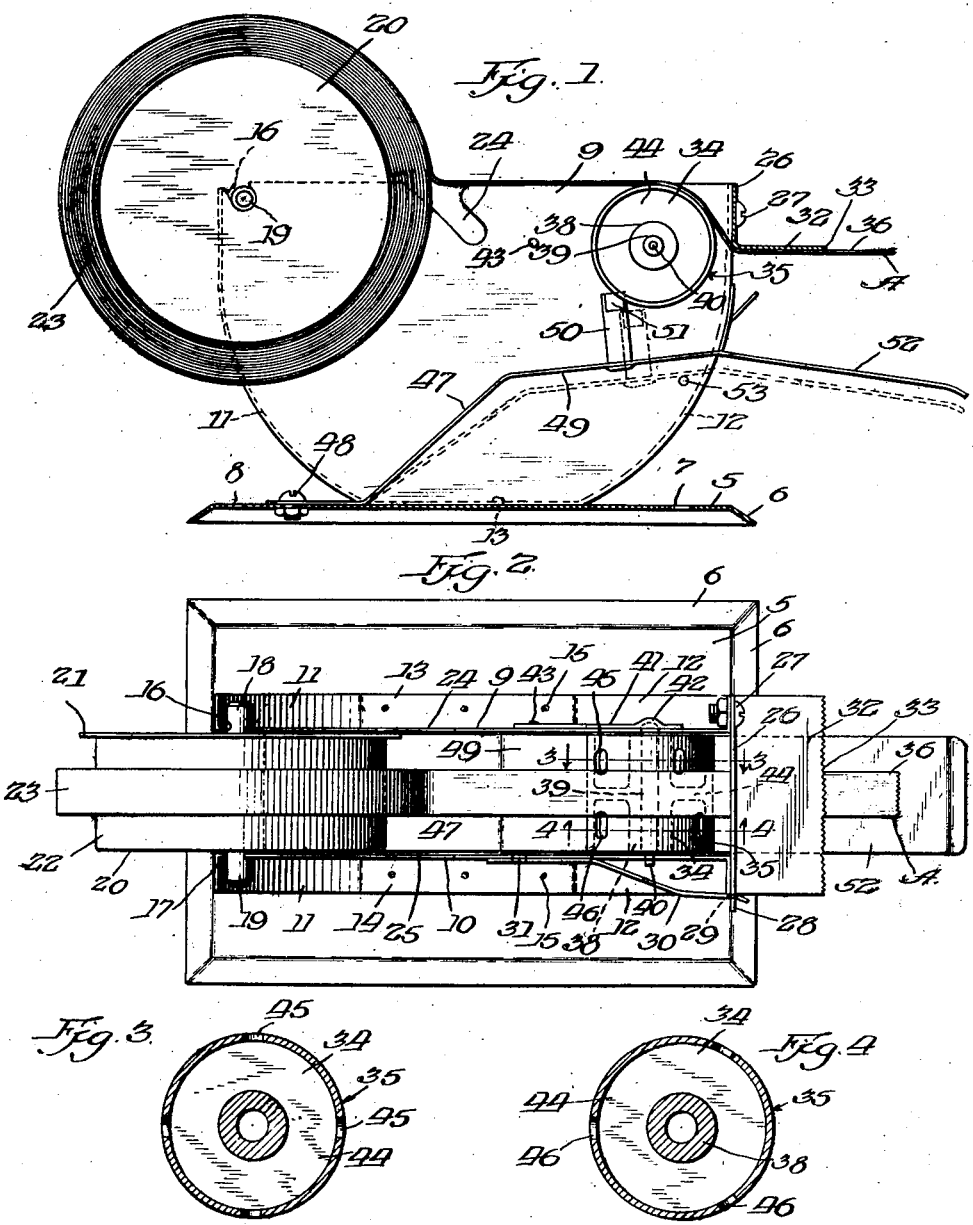

2,251,942

UNITED STATES PATENT OFFICE 2,251,942

APPARATUS FOR DISPENSING

Arthur E. Kimball, Chicago, Ill., assignor to Minnesota Mining & Manufacturing Company, St. Paul, Minn., a corporation of Delaware Application November 25, 1932, Serial No. 644,211
Renewed October 6, 1938

7 Claims. (Cl. 242—55.5)

This invention relates in general to improvements in the art of dispensing sheet material and includes an improved method of and apparatus for dispensing sheet material in predetermined quantities, more particularly for dispensing an adhesive coated tape, this tape usually being supplied in rolls from which the tape is unwound as it is required for use.

The invention is particularly adapted for dispensing in predetermined or measured quantities the tapes disclosed in Drew Patents Nos. 1,760,820 and 1,856,986 and Farrell Reissue No. 17,760, and such other similar tapes in which a pressure sensitive adhesive is applied to one surface of the tape, the adhesiveness of the pressure sensitive coating being relied upon in a large degree to complete the function of the method and apparatus involved in this invention.

The invention has as its principal objects and advantages the provision of an improved method of dispensing or supplying adhesively coated sheet material in measured quantities by relying upon the adhesiveness of the pressure sensitive coating co-operating with a measuring device, the invention also including a convenient form of apparatus for carrying out the method.

This invention has as other objects thereof the provision of improved tape dispensing apparatus in which an adhesively coated sheet material may be supported in the form of a roll or the like and from which the material may be unwound in measured quantities; the provision of an apparatus of the character referred to in which other measured quantities of the material or any measured quantities may be removed from the roll and in which means is provided for supporting the roll of tape to be dispensed so that it does not become entangled and so that a convenient end portion of the roll is presented in position to be grasped for dispensing purposes; the provision of an improved measuring means in a tape dispensing apparatus in which the adhesion between the tape coating and the movable measuring surface is relied upon for predetermining the amount of sheet material to be dispensed; the provision in a tape dispensing apparatus of a measuring roll against which the adhesive coated side of a tape may be engaged and to which the tape will be caused to adhere for regulating the amount of tape supplied; the provision of an improved tape dispensing apparatus in which the measuring means operates automatically, but which means may be rendered inoperative as desired; the provision of a tape dispensing apparatus in which the tape is held in such position when not being dispensed as to protect the adhesive coated surface thereof; and the provision of a tape dispensing apparatus of the character referred to which is compact and arranged in a unitary structure with the measuring element thereof so arranged as to permit of variation in the measuring facilities afforded thereby, and which tape dispensing apparatus may be manufactured at relatively low cost.

The foregoing and such other objects and advantages as may appear or be pointed out as this description proceeds are contained in the structural embodiment of the invention shown in the accompanying drawing in which Figure 1 is a vertical elevational sectional view of the tape dispensing apparatus; Figure 2 is a top plan view of the same; Figure 3 is an enlarged cross sectional view of the measuring roll taken on the line 3—3 of Figure 2 looking in the direction indicated by the arrows, and Figure 4 is a view similar to Figure 3 taken on line 4—4 of Figure 2, looking in the direction indicated by the arrows.

The characteristics of the tape disclosed and claimed in Drew Patent No. 1,760,820 are such that owing to the tacky and pressure sensitive nature of the adhesive I have found that I am enabled to dispense this tape in predetermined quantities by the steps of causing the coated side of the sheet to adhere to a measuring and feeding roll and then by exerting tension on the sheet and regulating rotation of the roll control the amount of tape supplied by the method involved. This method of dispensing the tape is not heretofore known to me, inasmuch as all previous tapes of a tacky nature were merely manually removed from the roll without any attempt to cause the same to engage a measuring means. Owing to the tenacity with which the pressure sensitive tape of Drew Patent No. 1,760,820 adheres to surfaces to which it is applied and is yet with great facility removed from these surfaces by a pull exerted at an angle to the surface to which it is applied the tape finds peculiar adaptability to dispensing and measuring by the method above referred to.

For carrying out the method of dispensing, I disclose a convenient apparatus in the accompanying drawing, and referring now more particularly to this apparatus, I have provided a structure which is a complete unit and may be formed of castings or sheet metal as desired. In order to facilitate manufacture of the apparatus and to reduce the ultimate cost thereof, I prefer to form the major portions thereof of suitable rigid sheet metal.

In the drawing the base formed of a relatively stiff sheet of metal is indicated at 5 and is provided with edge flanges 6 so that the base will be raised a slight distance from a surface on which the apparatus may be secured. Suitable apertures 7 and 8 are provided by which the base may be secured by screws or the like to a table or desk.

On the base 5 I provide a frame or support including the spaced side members 9 and 10, these members being formed substantially semi-circular and provided with curved end flanges 11—11 and 12—12, and base flanges 13 and 14 respectively. The base flanges 13 and 14 are suitably secured to the base member 5 by any convenient manner such, for example, as by spot welding or the like as indicated at 15. The two side members 9 and 10 thus present substantially smooth inside surfaces and form the container for the supporting and dispensing mechanism.

The upper edges of the side members 9 and 10 are provided with complemental notches at the rear end of the container, these notches being indicated at 16 and 17, to form bearings for supporting a shaft affording trunnions 18 and 19 projecting from a supporting and feeding drum 20. This drum 20 is thus removably and rotatably mounted in the side members 9 and 10. The drum is provided on one end with a flange 21 and has its peripheral surface 22 slightly tapered so that a roll 23 of adhesive coated tape may be slid on to the drum and frictionally held in position thereon. For smaller rolls of tape there may be provided a smaller drum, not shown, which is adapted to have supporting bearings indicated at 24 and 25 in the side members 9 and 10.

Near the end of the container adjacent to and beyond the drum 20, I provide a gate from which a strip of tape on the roll 23 is supplied. This gate, shown at 26, is pivotally mounted at 27 by the provision of a suitable bolt and nut engaging through a part of the lateral end flange 12. The gate 26 is thus held so that it may be swung upwardly and for retaining the gate in a closed or horizontal position spanning the two side members 9 and 10 I provide a lug 28 projecting from one end of the gate adapted to engage in an aperture 29 formed in a spring latch 30. One end of the spring latch 30 is riveted or spot welded as at 31 to the side member 10. A severing blade is formed on the gate 26 by bending a portion of the metal thereof outwardly as indicated at 32, and the outer edge of the blade 32 may be suitably serrated as at 33 to facilitate severing of the tape by an upward movement of the same against that edge.

In order to supply and measure the tape and to control the predetermined quantities as desired, I provide a measuring member which conveniently takes the form of a roller 34, whose cylindrical surface 35 is presented in such position as to be adjacent to the gate 26 and in position to receive direct contact with the under adhesive coated surface of the strip of tape or sheet material 36, passing from the roll 23 under the gate 26 as shown in Figure 1. The adhesively coated side of the tape being presented downwardly as shown contacts with the cylindrical surface 35 of the roll, clings thereto by its tacky nature and as the tape is pulled from the apparatus by grasping the same at its end A the roller is caused to rotate. This roller has a hub portion 38 mounted on a removable shaft 39, said shaft having the inner end reduced as at 40 for engagement in a suitable bearing aperture provided in the side member 10, the other end of the shaft projecting through the side member 9 and being retained in place thereon by spring clip 41 having a detent portion 42 overlying the adjacent end of the shaft. The spring clip 41 is pivotally mounted at 43 on the side member 9 so that if it is desired to remove the shaft 39 and reverse the roller 34 this may be accomplished without difficulty.

The roller is so constructed that its cylindrical body portion is supported from the hub by a disc-like web portion 44, thus leaving extending cylindrical portions so that the roller is substantially hollow. This construction is to be preferred inasmuch as it reduces the amount of material and facilities the operation of the arresting device or detent which limits the rotation of the roller. A solid roller could be as well employed.

The roller is so constructed as to co-operate with arresting means which serves to regulate the amount of rotation of the roller within predetermined limits, but which regulating means is adapted to be released at will to permit a greater degree of rotation of the roller as desired. The roller is provided with two series of apertures adjacent to the opposite ends as indicated at 45 and 46. The apertures may be spaced at desired predetermined equal intervals about the roller, one series, such as the series 45, being disposed about the cylindrical surface of the roller about 90 degrees apart, and the series 46 being disposed at about 120 degrees apart.

Below the roller when it is in operating position, I provide a stop means which includes a spring lever 47 extending from the rear end of the base 5 upwardly toward the roller 34 and outwardly beyond the gate and severing blade of the apparatus. This lever 47 is bolted at its inner end as indicated at 48 to the base 5 and at the medial portion 49 is provided with a detent or pawl 50 which extends upwardly therefrom and is formed with a polygonal end 51 adapted to engage in the apertures of the series 45 of openings as shown in Figures 1 and 2. By reversing the position of the roller this detent or pawl will engage the other series 46. Stop means 53 are provided on the side members 9 and 10 to limit the downward movement of the lever 47. These stop means are conveniently afforded by forming small inwardly extending dents in the walls 9 and 10 as shown. Thus when the outer end 52 of the lever 47 is depressed as shown in dotted line, Figure 1, the roller is released for rotation. The operator then grasps the end A of the tape, exerting a pull thereon. This depression of the lever 47 releases the roller so that a continued pull on the tape will cause the same to be dispensed under the severing blade 32. As the lever is released immediately after the tape begins to move, the detent will, due to the spring action of the lever 47, slide upon the adjacent surface of the roller until the next aperture is presented to the detent whereupon the detent enters the aperture and stops the rotation of the roller. By thus arresting the roller 34 and, due to the adhesion of the tape thereto, severing of a portion of the tape is facilitated, this being accomplished by an upward pull on the tape whereupon it is severed by the serrated edge of the blade 32. Thus the operator has obtained from the machine a piece of the tape which corresponds in length to the distance between apertures of the series presented to the detent or pawl at that particular time. The distance between apertures, and thus the length of a unit of tape dispensed upon a single depression of the lever may be predetermined by the diameter of the roller 34 and the spacing of the series of apertures. Should more than one unit be desired the lever 47 may be depressed each time the detent 50 engages one of the series of apertures, thus any desired number of units may be counted off. If desired the lever may be held down thus allowing the removal of any desired length of tape independently of the measuring means. It will be observed that when grasping in one hand the end A of the tape shown in Figure 1 to release the detent the operator may merely depress the lever 47 with one of the fingers of the same hand so that it is not necessary to employ two hands in order to operate the apparatus.

Having thus described my invention and illustrated its use, what I claim as new and desire to secure by Letters Patent is:

1. In a sheet dispensing apparatus, in combination, means for supporting a quantity of sheet material to be supplied and a roller adjacent to said supporting means and provided with a smooth measuring surface in contact with which said sheet material passes as it is supplied for use; a severing blade overlying the sheet material as it is fed over said roller, and a lever having means for controlling the rotation of said roller, said lever underlying said blade so that the roller may be released by the hand upon grasping the adjacent end of the sheet material.

2. In a sheet dispensing apparatus, in combination, means for supporting a quantity of sheet material to be supplied and a roller adjacent to said supporting means and provided with a smooth measuring surface in contact with which said sheet material passes as it is supplied for use; a severing blade overlying the sheet material as it is fed over said roller, said roller having a series of perforations therein in predetermined spaced relation, and a lever having means for engagement in said perforations for controlling the rotation of said roller.

3. In a sheet dispensing apparatus, in combination, means for supporting a quantity of sheet material to be supplied and a roller adjacent to said supporting means and provided with a smooth measuring surface in contact with which said sheet material passes as it is supplied for use; a severing blade overlying the sheet material as it is fed over said roller, said roller having a series of perforations therein in predetermined spaced relation, and a lever having means for engagement in said perforations for controlling the rotation of said roller, said lever underlying said blade so that the roller may be released by the hand upon grasping the adjacent end of the sheet material.

4. For use in dispensing portions of normally tacky adhesive material, in combination, means for supporting a length of the material having a tacky surface, a member for measuring said material as it is dispensed, the said material being in adhesive contact with said member, and said member being actuated by the adhesion of said tacky surface to said measuring member as motion is imparted to said material, whereby defacement of the material is avoided, means for arresting the movement of said measuring member and means for severing the material while the movement of said member is arrested, said severing means being spaced from said measuring member to permit the end of the material to be grasped for successive withdrawal of portions thereof.

5. Apparatus as claimed in claim 4, wherein the member for measuring is a roller.

6. For use in dispensing predetermined portions of adhesive sheet material having a normally tacky surface comprising, in combination, means for supporting a length of the material to be dispensed, means for sustaining and measuring said material as it is being dispensed, without perforation or defacement of said material by said support, said sustaining and measuring means being movable and actuated by the material being dispensed only by the adhesion thereto of the adhesive surface of said material while motion is imparted to said material by pulling thereon beyond said sustaining and measuring means, means for arresting the movement of said sustaining and measuring means whereby the material being dispensed is placed under tension and means for severing the said material under tension, said severing means being spaced from said sustaining and measuring means to permit the material to be grasped for successive withdrawal of portions thereof.

7. Apparatus as claimed in claim 6 wherein the member for measuring is a roller.

ARTHUR E. KIMBALL.